United States Patent
Lee et al.

(10) Patent No.: US 7,440,140 B2
(45) Date of Patent: Oct. 21, 2008

(54) SEQUENTIAL COLOR ERROR DIFFUSION WITH FORWARD AND BACKWARD EXCHANGE OF INFORMATION BETWEEN COLOR PLANES

(75) Inventors: Je-Ho Lee, San Diego, CA (US); Morgan Thomas Schramm, Portland, OR (US); Jason M. Quintana, Bush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 11/118,829

(22) Filed: Apr. 29, 2005

(65) Prior Publication Data

US 2006/0245001 A1    Nov. 2, 2006

(51) Int. Cl.
*G06T 5/00* (2006.01)
(52) U.S. Cl. ..................................... 358/3.03
(58) Field of Classification Search ............... 358/1.9, 358/1.1, 3.1, 3.09, 3.06, 3.01, 3.05, 3.03, 358/1.7; 382/167, 162, 251, 232
See application file for complete search history.

(56) References Cited

U.S. PATENT DOCUMENTS

| | | | | |
|---|---|---|---|---|
| 5,142,374 A | * | 8/1992 | Tajika et al. | 358/3.1 |
| 5,822,094 A | * | 10/1998 | O'Sullivan et al. | 398/18 |
| 5,930,010 A | | 7/1999 | Cheung et al. | |
| 5,949,965 A | | 9/1999 | Gondek | |
| 5,973,803 A | | 10/1999 | Cheung et al. | |
| 5,974,228 A | * | 10/1999 | Heitsch | 358/1.9 |
| 6,250,733 B1 | | 6/2001 | Yao et al. | |
| 6,363,172 B1 | | 3/2002 | Cheung et al. | |
| 6,407,825 B1 | * | 6/2002 | Couwenhoven et al. | 358/1.9 |
| 6,498,685 B1 | * | 12/2002 | Johnson | 359/626 |
| 6,501,564 B1 | | 12/2002 | Schramm et al. | |
| 6,563,957 B1 | | 5/2003 | Li et al. | |
| 6,778,299 B2 | * | 8/2004 | Lin et al. | 358/3.03 |
| 6,801,337 B2 | | 10/2004 | Bhaskar et al. | |
| 2004/0100646 A1 | * | 5/2004 | Quintana | 358/1.9 |

\* cited by examiner

*Primary Examiner*—Mark K Zimmerman
*Assistant Examiner*—James A Bonner, Jr.

(57) ABSTRACT

Disclosed are methods of halftoning images having multiple color planes using error diffusion techniques, and incorporating both error information from the previously-processed color planes of a pixel, and error information from a previously process pixel of yet-to-be processed color planes.

28 Claims, 5 Drawing Sheets

SEQUENTIAL COLOR ERROR DIFFUSION WITH FORWARD AND BACKWARD EXCHANGE OF INFORMATION BETWEEN COLOR PLANES

FIELD OF INVENTION

The present disclosure relates generally to methods of digital halftoning, and more specifically to methods of sequential color error diffusion halftoning.

BACKGROUND

Halftoning is well known in the art. Image capture devices, such as cameras and scanners, typically record images using a range of tonal values for each pixel, such as, for example, 256 possible levels for each primary color. Since many printing processes utilize fixed-size dots of colorants to form images, halftoning is used to spatially distribute the dots in a manner which the eye interprets as having the appropriate overall tone.

In inkjet printing systems, an inkjet printhead is typically mounted on a carriage that is moved back and forth across a print media, such as paper. As the printhead is moved across the print media, a control system activates the printhead to deposit or eject fixed-size ink droplets onto the print media to form text and images. Ink is provided to the printhead from ink supplies that are either carried by the carriage or mounted to a fixed receiving station. Typically, at least four separate ink colors (such as black, cyan, magenta, and yellow) are required to faithfully reproduce color images.

In electrophotographic or "laser" printing systems, marking material commonly called "toner" is provided by an electrophotographic engine frequently referred to as a toner cartridge. The toner cartridge often includes an intermediate imaging device such as a drum, and a reservoir of imaging material such as powdered toner. The drum is charged using an energy source such as a scanning laser. The process is substantially binary, in that a small region forming a dot is either "on" or "off". The imaging material is attracted to the charged drum and is then transferred to print media.

One common halftoning technique is known as error diffusion. In error diffusion, for each color component of an image pixel, the decision to output a corresponding output pixel by the image-forming device is based on the intensity level of the color component of the image pixel, as well as the output pixels output for the previous image pixels. Error diffusion tries to distribute output pixels so as to reduce or eliminate pixel overlap, reduce large areas of empty space between output pixels, and otherwise create eye-pleasing patterns. For a more complete discussion of error diffusion halftoning, see Robert Ulichney, *Digital Halftoning*, MIT Press, Cambridge, Mass., 1987.

Halftoning is typically computationally intensive, in that each pixel of the image must be sequentially processed; further, many halftoning techniques require multiple iterations. Many techniques function well in some circumstances but produce visible artifacts in other situations, such as when two or more color components of comparable strength form part of an image. Other factors also affect perceived image quality; for example, for best image quality, it is typically desirable that the printing of multiple colorants on the same dot be minimized. Managing the distribution of overall dots and individual color dots homogeneously while maintaining minimum dot-on-dot printing has proven to be a very hard problem to solve, especially with efficient, non-iterative halftoning methods such as error diffusion. There is thus a continuing need for halftoning techniques that are computationally efficient yet produce images with a minimum of perceptible artifacts.

SUMMARY OF THE INVENTION

Exemplary embodiments of the invention include methods of halftoning images having multiple color planes using error diffusion techniques, and incorporating both error information from the previously-processed color planes of a pixel, and error information from a previously process pixel of other color planes.

Other aspects and advantages of the present invention will become apparent from the following detailed description, taken in conjunction with the accompanying drawings, illustrating by way of example the principles of the invention.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DESCRIPTION OF EXEMPLARY EMBODIMENTS

In the following specification, for purposes of explanation, specific details are set forth in order to provide an understanding of the present invention. It will be apparent to one skilled in the art, however, that the present invention may be practiced without these specific details. Reference in the specification to "one embodiment" or "an exemplary embodiment" means that a particular feature, structure, or characteristic described in connection with the embodiment is included in at least one embodiment. The appearance of the phrase "in one embodiment" in various places in the specification do not necessarily refer to the same embodiment.

Figure 1:
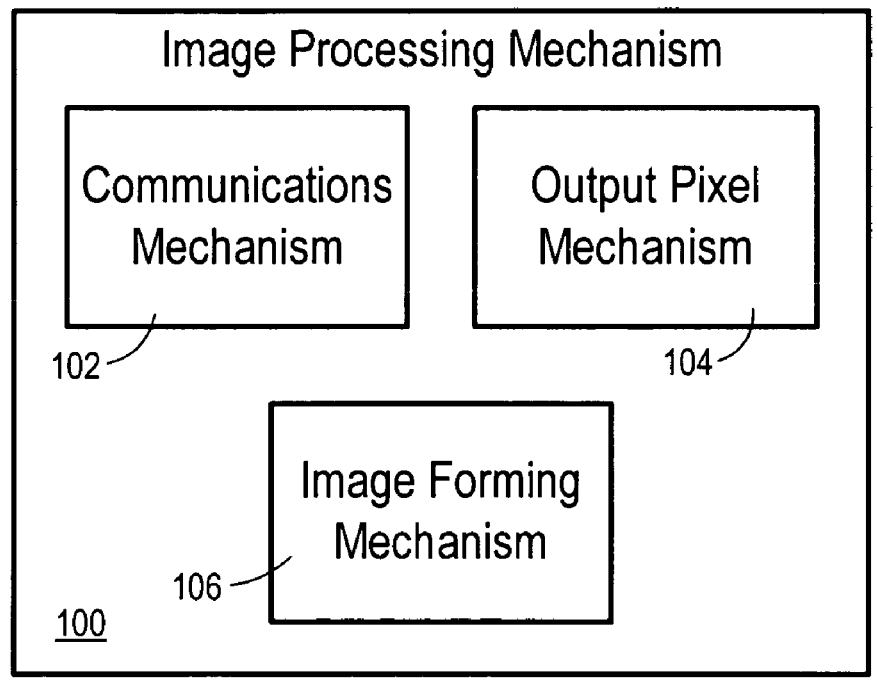
FIG. 1 is a block diagram of an image processing device such as may utilize embodiments of the invention.

FIG. 1 is a block diagram of an exemplary image processing device 100 which can perform embodiments of the invention. The image-processing device may, by way of example, be an image forming device such as an inkjet printer, a laser printer, or another type of image-forming device; or it may be a computing device, such as a desktop or a laptop computer, a personal digital assistant (PDA) device, a digital camera, or another type of computing device. The image processing device 100 includes a communications mechanism 102, an output pixel mechanism 104, and an image-forming mechanism 106. As can be appreciated by those of ordinary skill within the art, the device 100 can include other mechanisms in addition to or in lieu of the mechanisms depicted in FIG. 1.

The communications mechanism 102 receives image data that has a number of image pixels, from a communicatively coupled source device, such as a computing device like a computer, a digital camera, a personal digital assistant (PDA) device, or another type of computing device. The communications mechanism 102 may include wired and/or wireless communications adapters, such as serial ports, Universal Serial Bus (USB) ports, parallel ports, Ethernet adapters, 802.11b wireless network adapters, Bluetooth wireless adapters, and so on.

The output pixel mechanism 104 performs the methods of the invention as described below. In general terms, the output pixel mechanism 104 determines whether, for each color component of each image pixel, an output pixel should be output. The output pixel mechanism 104 may include computer-executable instructions organized as computer programs, subroutines, modules, objects, and so on.

The output pixel mechanism 104 typically determines, for each output pixel, whether to output a pixel of a colorant. For each image pixel of image data, there is an intensity value for each color component of the color space of the image data. For example, a given image pixel may have intensity values between 0 and 255 for each of the cyan, magenta, yellow, and black color components. An output pixel may be output for each color component of the image pixel. An output pixel is binary, having on and off states. That an output pixel has been output means that the on state of the output pixel has been output, such as corresponding to the ejection of ink or other fluid by the image-forming device, or such as the exposure of a region on a photoconductor corresponding to the output pixel by a laser in the image-forming device. That an output pixel has not been output means that the output pixel has the off state, such as corresponding to no ink or other fluid being ejected by the image-forming device, or no exposure of the region on the photoconductor corresponding to the output pixel.

The output pixel mechanism 104 outputs the output pixels to the image forming mechanism 106, which forms the pixels into a completed image. In the case where the image-forming device 100 is an inkjet printer, for example, the image forming mechanism 106 may include an inkjet-printing mechanism. Similarly, in the case where the image-forming device 100 is a laser printer, the image forming mechanism 506 may include a laser-printing mechanism.

Figure 2:
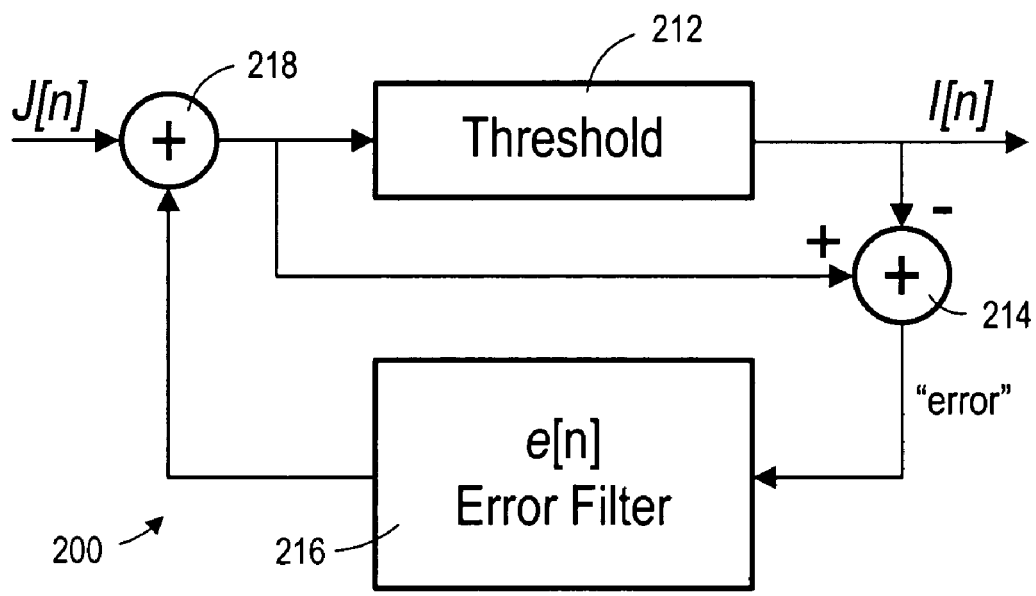
FIG. 2 is a block diagram summarizing prior art conventional error diffusion halftoning.

FIG. 2 is a diagram illustrating conventional prior art error diffusion halftoning. In error diffusion halftoning, the decision of whether or not to "fire" a drop at a given pixel location depends not just on the tone value at that pixel location, but also on information "diffused" from other pixel locations. A common algorithm is that first introduced by Floyd and Steinberg in 1975 (Floyd, R. W., and L. Steinberg, "Adaptive algorithm for spatial grey scale", *SID Int. Sym. Digest of Tech. Papers*, pp. 36-36).

As shown in FIG. 2, digital image input data, i.e., a continuous amplitude, discrete-space image J[n] is input to a summing junction 218. For each pixel, the tone value is input at J[n] to a threshold detector 212 which compares the tone value to a predetermined threshold value, referred to as the error diffusion threshold. If the input value exceeds the threshold value, the output I[n] is a "one", and a dot is "fired" at the corresponding location.

The quantized quantity, zero or one, is subtracted from the input tone value at summing junction 214 to form an error term. For example, if the input tone value for a given pixel is one fourth, or $64/256$, and the threshold value is 50%, or $128/256$, then the quantized value will be zero and the error term will be $64/256 - 0 = 64/256$. Fifty percent is a commonly used threshold value for error diffusion halftoning. In the example, since the pixel of interest has a tone value of 64 but no dot was fired (the quantized value is zero), there is a positive error to be "diffused" among surrounding pixels. The tone values of selected surrounding pixels are adjusted (increased in this example) such that the average tone of the output image will be faithful to the input image tone values.

Figure 3:
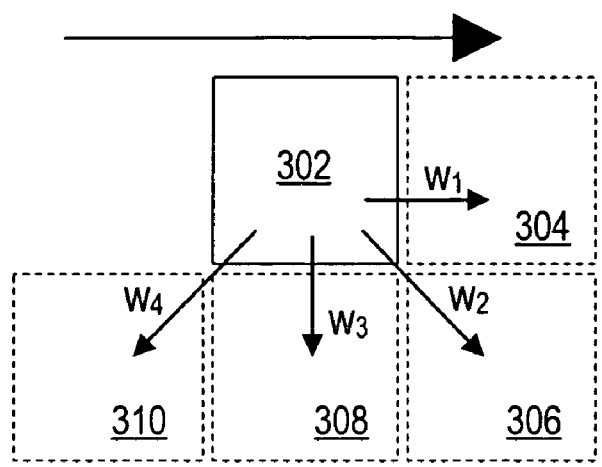
FIG. 3 further illustrates error diffusion halftoning.

The manner in which the error term is diffused is often defined by an error filter. One commonly-used error filter is the Floyd and Steinberg filter illustrated in FIG. 3. As shown in FIG. 3, the error term for a given pixel 302 is diffused among the four adjacent yet-to-be processed pixels 304, 306, 308, 310 of the given pixel. At each adjacent pixel, a weighted portion of the error term is added to the source image pixel tone value. The weights are selected such that the total diffused error has the same total magnitude; in the exemplary Floyd and Steinberg filter, w1 is $7/16$, such that the next pixel 304 in the row being processed receives $7/16$ of the diffused error (in the above example, $28/256$); w2 is $1/16$, such that pixel 306 receives $1/16$ of the diffused error ($4/256$ in the example); and w3 and w4 are $5/16$ and $3/16$, respectively.

Figure 4A:
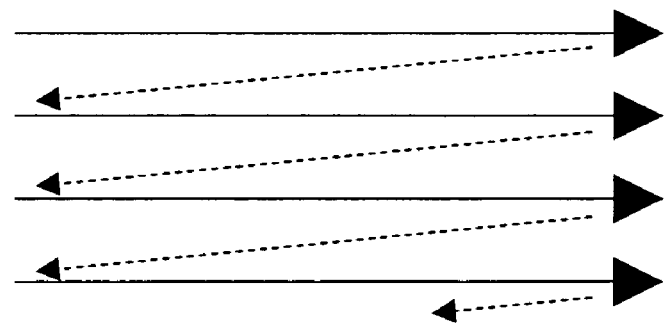
FIGS. 4(*a*) and 4(*b*) illustrate scanning rasters and serpentine rasters, respectively.
Figure 4B:
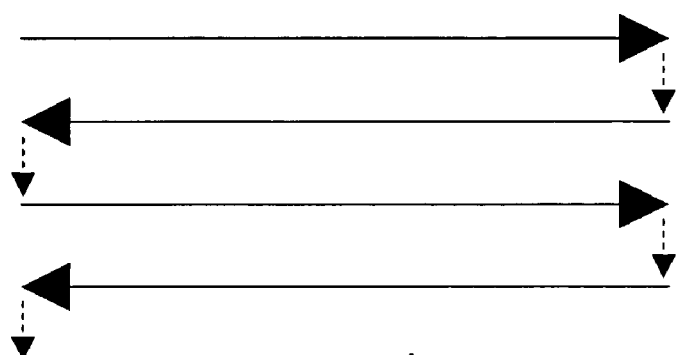

When halftoning a complete image, error diffusion algorithms typically proceed by computing quantized values for all pixels in a row of the image, and then advance to the next row. In some embodiments, the algorithm may return to the original starting side of the image at the start of each row, as depicted in FIG. 4(*a*) (a "unidirectional scan"). To further help diminish visible artifacts in the halftoned output, some embodiments instead use a "serpentine scan", in which the scan direction is reversed for each successive row, as shown in FIG. 4(*b*) (sometimes also called a "boustrophedonic scan", which literally refers to the pattern oxen follow when plowing a field). When scanning in the right-to-left direction, the pixel pattern for error diffusion depicted in FIG. 3 would likewise be reversed.

While the above-described exemplary error-diffusion technique works well when halftoning a grayscale image, the images produced by modern printing equipment generally include color images, which are typically composed of multiple color "planes" in addition to a black plane, such as, for example, separate color planes for cyan, magenta, and yellow. "Photo quality" printing may utilize additional ink colors and therefore additional planes, such as light cyan and light magenta, or multiple shades of gray. The application of conventional error diffusion halftoning to images with multiple image planes can be problematic, in that undesirable artifacts must be avoided not only in the image as a whole but in the planes individually. Two previous algorithms that apply error diffusion halftoning to multiple color planes with reduced artifacts are discussed in U.S. patent application Ser. No. 10/304,319, "SUBSTANTIAL PRECLUSION OF OUTPUT OF PIXELS FOR OTHER COLOR COMPONENTS UPON OUTPUT OF PIXEL FOR IMAGE PIXEL COLOR COMPONENT", and U.S. patent application Ser. No. 10/304,492, "SPACING OUT OUTPUT OF PIXELS FOR OTHER COLOR COMPONENTS UPON OUTPUT OF PIXEL FOR COLOR COMPONENT OF AN IMAGE", both assigned to the assignee of the present invention.

Embodiments of the invention address several issues that arise when error diffusion halftoning is applied to multiple color planes. Ideally, in the halftoned image, the dots for each individual color should be arranged as uniformly as possible. Also, the overall composite texture that consists of all the colorant dots should be as uniform as possible. Dot-on-dot printing should be minimized as much as possible, and white space not covered by dots should be minimized to ensure a smooth and grainfree textures, as well as a larger color gamut. Despite the advances of color error diffusion research, the existing algorithms typically do not completely satisfy these criteria.

Figure 5:
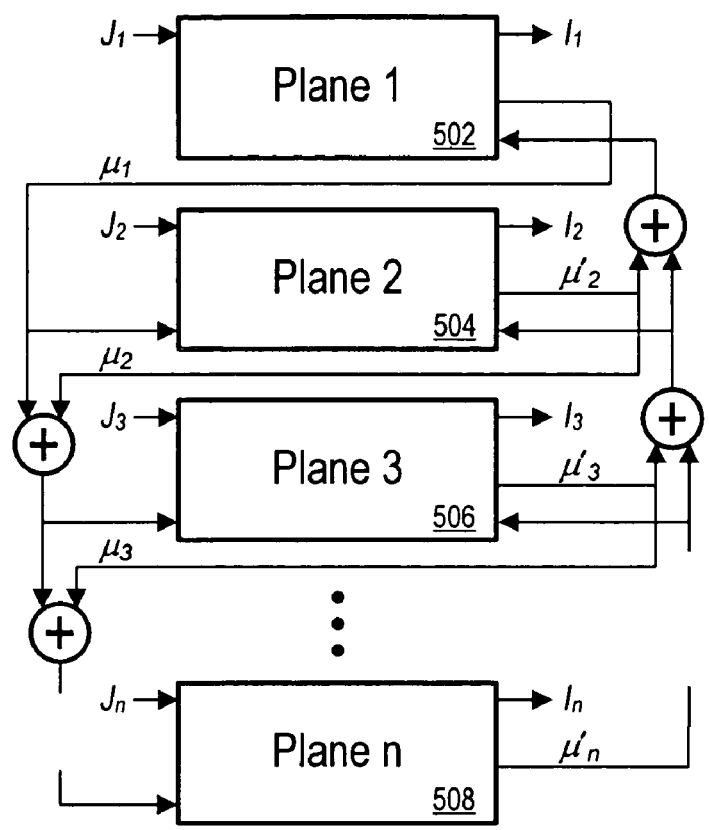
FIG. 5 is a block diagram illustrating a generalized exemplary embodiment of the invention.

FIG. 5 is a block diagram depicting an embodiment of the present invention. Embodiments of the present invention utilize a sequential configuration, i.e., color planes are prioritized (the darkest plane has the highest priority) and halftoned in order of their prioritization. As shown in FIG. 5, for example, "plane 1" 502 may be the image plane containing information for printing black; "plane 2" 504 may be cyan; "plane 3" 506 may be magenta; and "plane n" 508 may be yellow. Embodiments of the invention typically employ tone-dependent weights and thresholds to halftone each individual plane; conventional fixed weights and thresholds may also be employed. In order to account for plane-dependency, information from the earlier halftoned planes is "fed forward" so that the result of the halftoned planes can influence the halftoning of later planes. This feed-forward information can effectively dampen firing in locations where darker planes have already fired, and increase firing in locations where darker planes did not fire. Embodiments of the invention use the quantization error between the modified input and output values as the feed-forward parameter to modulate the threshold. With subscripts representing planes, the feedforward parameter is given by:

$$\varepsilon_i = \sum_{j<i} \mu_j(f_j) \times q_j \qquad \text{eq. 1}$$

where qj is the quantization error and μj is a weight at jth plane, respectively. Note that μj is a function of input tone fj. In general, it is desirable to have a lower μj to lessen the constraints for a darker tone. Embodiments of the invention also "feed-back" information from the lighter planes to the darker planes to penalize the darker dot being fired on the next to the lighter dots. The modified input value is used as the feed-back parameter:

$$\varepsilon'_i = \sum_{j>i} \mu'_j(\tilde{f}_j) \qquad \text{eq. 2}$$

Here, $\mu'_j$ is another weight, which controls the strength of modulation in the feed-back path. Note that $\mu'_j$ is a function of the modified input tone $\tilde{f}_j$. The modified input tone contains the information if the given jth plane has been recently fired as it incorporates the propagated quantization errors from previous pixels. Those feed-forward and feed-back paths together provide a way of exchanging information among planes so that the algorithm can render overall dot pattern and individual dot pattern both uniformly.

Figure 6:
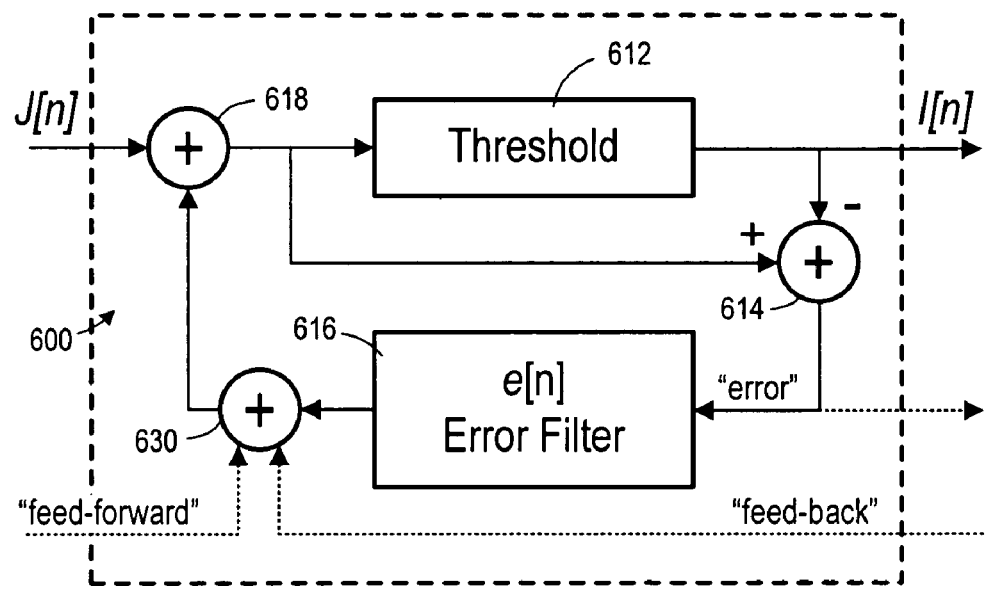
FIG. 6 is a block diagram illustrating how embodiments of the invention are incorporated into error diffusion halftoning.

FIG. 6 further illustrates how embodiments of the invention are incorporated into an error diffusion halftoning process. FIG. 6 shows a single color plane 600; the process would be duplicated for each color plane of a pixel. As in FIG. 2, image J[n] is input to a summing junction 618 and then to a threshold detector 612 which compares the tone value to a predetermined threshold value, referred to as the error diffusion threshold. Unlike FIG. 2, though, the summing junction 618 sums not just the output of error filter 616, but also includes error contributions from the other color planes, which are summed at 630. For color planes other than the "highest" (typically, black) color plane, the error contributions include feed-forward components from each of the higher planes, each weighted by the weighting factor, $\mu_j$, for the originating plane.

For color planes other than the "lowest" (typically, yellow) the error contributions include feed-back components from the lower planes, each weighted by a weighting factor, $\mu'_j$, for the originating plane. The feedback allows lower planes to influence the "firing" of the higher planes, thus permitting better spacing and placement of the dots of the lower planes. The weighting factors $\mu_j$ and $\mu'_j$ are selected to balance the goals of uniform overall dot placement and dot placement within each color.

As in FIG. 2, the quantized quantity, zero or one, is subtracted from the input tone value at summing junction 614 to form an error term. Error filter 616 may essentially be a Floyd and Steinberg filter, or other error diffusion filter.

Figure 7:
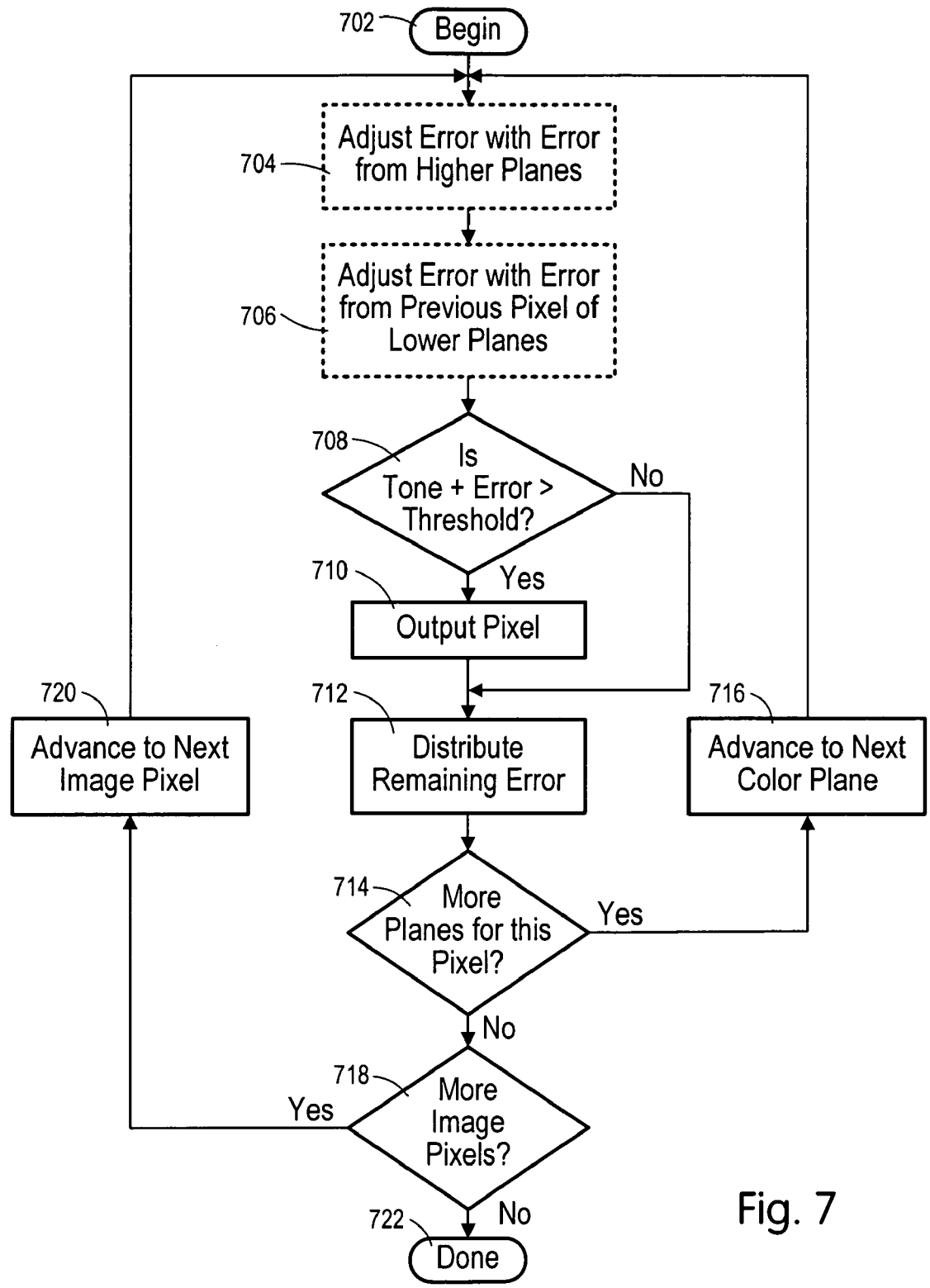
FIG. 7 is a flowchart illustrating an exemplary embodiment of the invention.

FIG. 7 is a flow diagram of an exemplary embodiment of the invention. It is assumed in FIG. 7 that, when the determination of whether to output a "dot" or "drop" for a pixel of a particular color plane begins 702, an error value for the pixel has been determined based on the diffusion of error from previously-processed pixels in the color plane according to an error diffusion technique as described above. The error value, for example, may include contributions from each of four adjacent previously-processed pixels, according to the Floyd and Steinberg algorithm. Other error diffusion algorithms may also be employed. It is also assumed that the color planes for each pixel are prioritized in order of approximate color "strength"; that is, for a four color printing system, black is typically processed first, followed by cyan, magenta, and finally yellow.

The error value is then adjusted 704 based upon the error values from the previously-processed, or "higher", color planes for the pixel. For example, the cyan plane may be adjusted by only the black plane; the magenta plane by the black and cyan planes; and so forth. In the case of the "highest" color plane, such as black, no adjustment is performed (indicated by the dashed line outlining block 704).

According to embodiments of the invention, the error value is then also adjusted 706 based upon the error values of the "lower" color planes from the preceding pixel. For example, the error values for cyan, magenta, and yellow from the most recent previously processed pixel may be weighted and summed and applied to the black plane. For the lowest or least dark color plane (such as, for example, yellow), since no lower planes exist, no adjustment based on lower planes is made (indicated in FIG. 7 by the dashed line for 706).

Embodiments of the method which employ a "serpentine" raster to process the image may utilize the error information from the last pixel of the previous row for the first pixel of a new row; other embodiments may utilize conventional raster-scan processing. The method may also include substantially precluding the output of a pixel in the color plane if a pixel were output in a higher plane; or may block the output of a pixel in the color plane if the input tone value for the color is zero; or may include "overflow" processing to force the output of a dot or drop at the present location if the pixel would otherwise be "lost" or omitted from the image; all of which are known in the art. The method will typically also include the appropriate initializing of information (such as initially resetting the accumulated errors for all the color components).

Embodiments of the invention then determine if the combined tone value plus error for the pixel is above a threshold 708 and, if yes, output a pixel 710 for the color plane being processed. As in conventional error diffusion halftoning, the remaining error is distributed 712 according to a particular error filter, such as, for example, Floyd and Steinberg. Also as in conventional multicolor halftoning, the method proceeds sequentially through the color planes for each pixel; if there are more planes to processed for the given pixel 714 the method advances to the next color plane 716; if there are no more color planes to be processed for the pixel, the method then determines if there are further image pixels to be processed 718, and, if yes, advances to the next image pixel 720. When all image pixels of the image have been halftoned, the method ends 722.

Other techniques may also be combined with the halftoning techniques of the present invention to further improve the perceptible quality of the output image. Many of these techniques involve injecting further randomness into the output pattern. For example, rather than utilizing a fixed threshold value in determining whether to output a pixel, a somewhat "fuzzy" or "noisy" threshold may be utilized. The threshold may comprise a threshold "range" rather than a single threshold value; if the total pixel error value falls below the range, a pixel isn't "fired"; if the value falls above the range, the pixel is fired; and if the value falls within the range, a randomnizing mechanism, such as look-up table, may be used to determine whether a pixel is fired.

While the exemplary embodiment described immediately above assumes that the methods of the invention are applied to all color planes of the image pixel, improvement in the output image may be achieved by applying the method to only a subset of the color planes. For example, since cyan and magenta have substantially similar "strengths" and are the component colors of blue (which often forms large areas of substantially uniform color as sky in photographs, where artifacts are particularly noticeable) the "feed-forward" and "feed-back" of information may be limited to only those two colors, thus speeding up the processing of the image.

Embodiments of the invention have been described thus far are particularly related to binary halftoning, in which an output pixel for a given color component of an image pixel is either on or off. That is, the output pixel may have one of two values. However, as can be appreciated by those of ordinary skill within the art, other embodiments of the invention can be utilized in conjunction with multi-level halftoning, in which an output pixel for a given color component of an image pixel may have one of a number of different values. For example, within an inkjet printer, a given output pixel may correspond to zero, one, or two drops of ink, such that there are three different values that the output pixel can have. Inkjet printers may also employ different drop sizes to achieve a wider range of tones, such as using a smaller drop size to print lighter tones.

The methods of the invention can be implemented by computer-executable instructions, such as those of one or more computer programs, and stored on a computer-readable medium. The computer-readable medium may be volatile or non-volatile memory, a magnetic, optical, and/or solid state memory, and so on.

Figure 8:
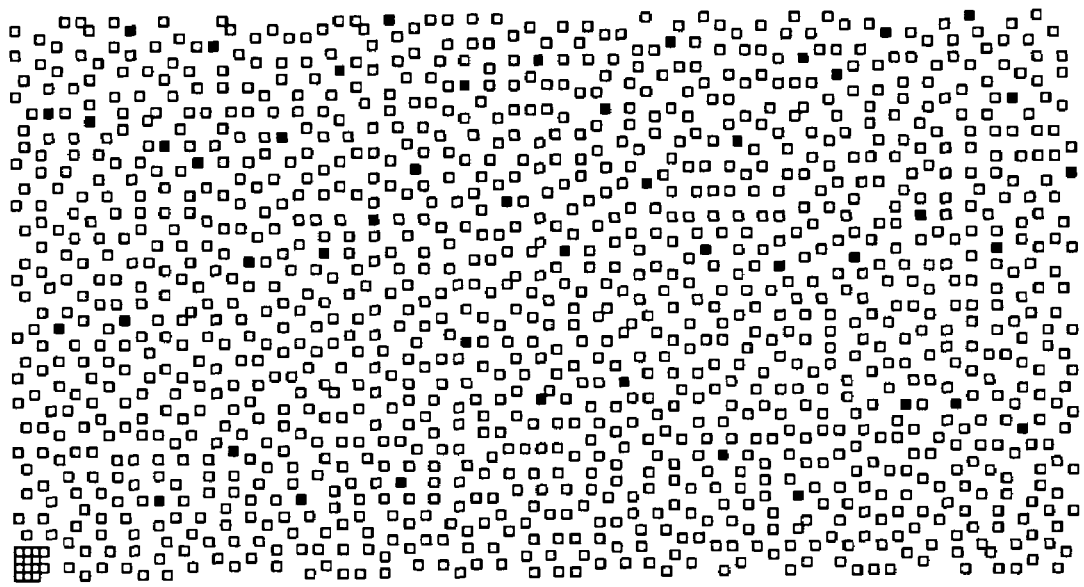
FIG. 8 illustrates an exemplary image halftoned without utilizing embodiments of the invention.

FIG. 8 shows an area hafltoned by an error diffusion technique lacking the "feed-back" paths of the present invention. The pixels designate with unfilled squares represent a first color, for example cyan, and the pixels designated with filled squares represent a second color, such as magenta (thus, the area depicted may be understood to show an area of an image that is "light blue"). Since, without the "feed-back" from the subsequent planes, the placement of the pixels of the first color (cyan) create essentially unilateral constraints on the placement of the pixels of the second color (magenta), the pixels of the second color may be seen in some instances fall into groups or into patterns that the eye perceives as forming lines. These groups or patterns may be perceived by a viewer of the image as directional color artifacts.

Figure 9:
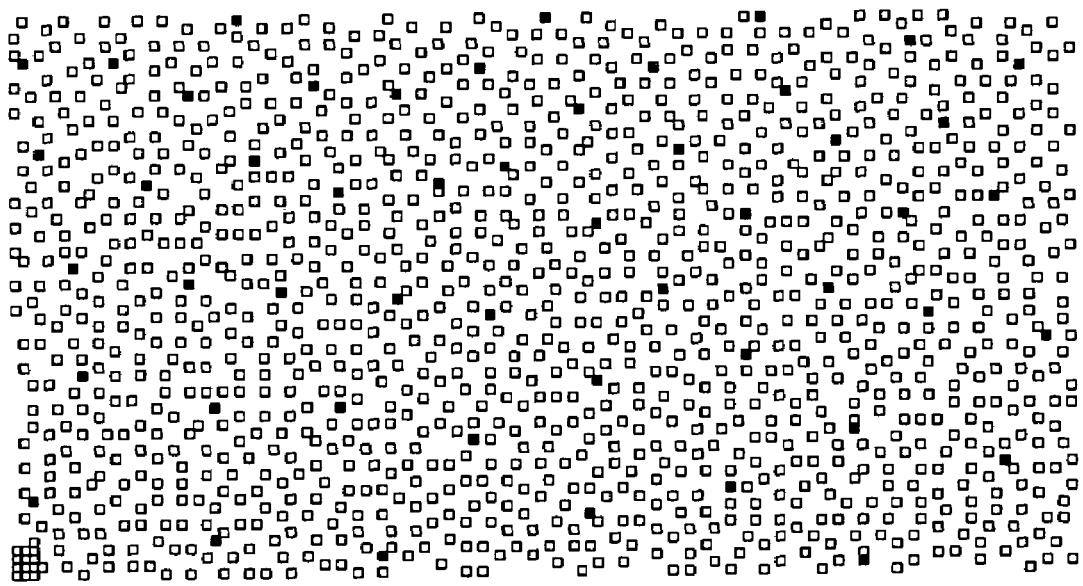
FIG. 9 illustrates an exemplary image halftoned utilizing an embodiment of the invention.

FIG. 9 shows a similar area halftoned utilizing an embodiment of the present invention, in which feed-back of error information from the previous pixel of the lower color plane is utilized. It may be observed that both colors (i.e., both the filled and unfilled squares) exhibit even distributions, which to a viewer of the overall image would be seen to be devoid of artifacts.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

What is claimed is:

1. A method of halftoning a color image, comprising:
for a color component of a current pixel,
comparing an error value to a threshold to determine whether to output a pixel for a current color plane, the error value including diffused error from previously-processed pixels of the current color plane,
the error value adjusted based upon a first error contribution from a previously-processed color plane of the current pixel,
the error value further adjusted based upon a second error contribution from a previously-processed pixel of a color plane that has not yet been processed for the current pixel.

2. The method of halftoning a color image of claim 1, wherein the color components of a pixel are sequentially processed in an order determined substantially by the darkness of the color components, with a darker color component processed before a lighter color component.

3. The method of halftoning a color image of claim 2, wherein the color components include at least cyan and magenta.

4. The method of halftoning a color image of claim 2, wherein the color components include at least black, cyan, magenta, and yellow.

5. The method of halftoning a color image of claim 1, wherein the diffused error from previously-processed pixels of the current color plane substantially comprises error from four previously-processed pixels of the current color plane, the four previously-processed pixels adjacent to the current pixel.

6. The method of halftoning a color image of claim 5, wherein the diffused error from the four previously-processed pixels is weighted according to a Floyd and Steinberg filter.

7. The method of halftoning a color image of claim 1, wherein the diffused error from previously-processed pixels of the current color plane substantially comprises error from a plurality of previously-processed pixels of the current color plane; and wherein the diffused error is weighted according to an error diffusion filter.

8. The method of halftoning a color image of claim 1, wherein the threshold comprises a fixed threshold.

9. The method of halftoning a color image of claim 1, wherein the threshold comprises a noisy threshold.

10. The method of halftoning a color image of claim 1, wherein the first error contribution from a previously-processed color plane of the current pixel is multiplied by a first weighting factor and added to the error value.

11. The method of halftoning a color image of claim 1, wherein the second error contribution from a previously-processed pixel of a color plane that has not yet been processed for the current pixel is multiplied by a second weighting factor and added to the error value.

12. The method of halftoning a color image of claim 1, wherein the first error contribution from a previously-processed color plane of the current pixel further comprises error contributions from each previously-processed color plane of the current pixel.

13. The method of halftoning a color image of claim 1, wherein the error contribution from a previously-processed pixel of a color plane that has not yet been processed for the current pixel further comprises error contributions from each color plane that has not yet been processed for the current pixel.

14. The method of halftoning a color image of claim 1, wherein the image comprises an array of pixels arranged in rows and columns, and wherein the pixels are processed according to a serpentine raster.

15. The method of halftoning a color image of claim 1, wherein the image comprises an array of pixels arranged in rows and columns, and wherein the pixels are processed according to a scanning raster.

16. The method of halftoning a color image of claim 1, further comprising substantially precluding the output of a pixel in the current color plane if a pixel were output in a previously-processed color plane of the pixel.

17. The method of halftoning a color image of claim 16, further comprising forcing the output of a pixel in the current color if the pixel would otherwise be omitted.

18. A method of halftoning a color image, comprising:
for substantially each pixel:
for a plurality of color planes:
receiving a diffused error from previously-halftoned pixels of the color plane;
adjusting the error based upon a first error contribution from any previously-processed planes of the pixel;
further adjusting the error based upon a second error contribution from each of a most-recently processed previous pixel of any yet-to-be processed color plane of the pixel; and
comparing the adjusted and further-adjusted error to a threshold.

19. The method of halftoning a color image of claim 18, wherein the plurality of color planes are processed sequentially substantially in order of darkness, with a darker color plane processed before a lighter color plane.

20. The method of halftoning a color image of claim 19, wherein the plurality of color planes include at least cyan and magenta.

21. The method of halftoning a color image of claim 19, wherein the plurality of color planes include at least black, cyan, magenta, and yellow.

22. The method of halftoning a color image of claim 18, wherein receiving a diffused error from previously-halftoned pixels of the color plane comprises receiving a diffused error according to an error diffusion filter.

23. The method of halftoning a color image of claim 22, wherein the error diffusion filter comprises a Floyd and Steinberg filter.

24. The method of halftoning a color image of claim 18, wherein the color image comprises an array of pixels arranged in rows and columns, and
wherein the pixels are processed according to a serpentine raster.

25. The method of halftoning a color image of claim 18, wherein the color image comprises an array of pixels arranged in rows and columns, and
wherein the pixels are processed according to a scanning raster.

26. The method of halftoning a color image of claim 18, further comprising
substantially precluding the output of a pixel in a color plane if a pixel were output in a previously-processed color plane of the pixel.

27. The method of halftoning a color image of claim 18, further comprising forcing the output of a pixel in the current color if the pixel would otherwise be omitted.

28. A method of halftoning a color image, the color image composed of an array of pixels having multiple color planes, the method comprising:
for each pixel, sequentially processing the multiple color planes based substantially on the darkness of the planes, with a darker plane processed before a lighter plane;
for each color plane of a pixel:
receiving a diffused error from previously-processed pixels of the color plane according to an error diffusion filter;
if one or more substantially darker color planes exist, adjusting the error based upon one or more first adjustment factors received respectively from the one or more substantially darker color planes;
if one or more substantially lighter color planes exist, further adjusting the error based upon one or more second adjustment factors received respectively from the one or more substantially lighter color planes; and
comparing the adjusted and further adjusted error to a threshold to determine whether to output a pixel.

* * * * *